(12) United States Patent
Lei

(10) Patent No.: US 12,160,875 B2
(45) Date of Patent: Dec. 3, 2024

(54) MODE SWITCHING METHOD FOR BROADCAST SERVICE AND RELATED DEVICE

(71) Applicant: TENCENT TECHNOLOGY (SHENZHEN) COMPANY LIMITED, Guangdong (CN)

(72) Inventor: Yixue Lei, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 456 days.

(21) Appl. No.: 17/453,106

(22) Filed: Nov. 1, 2021

(65) Prior Publication Data

US 2022/0053456 A1 Feb. 17, 2022

Related U.S. Application Data

(63) Continuation of application No. PCT/CN2020/118250, filed on Sep. 28, 2020.

(30) Foreign Application Priority Data

Nov. 7, 2019 (CN) .......................... 201911083105.7

(51) Int. Cl.
*H04W 72/30* (2023.01)
*H04W 4/02* (2018.01)
(Continued)

(52) U.S. Cl.
CPC ........... *H04W 72/30* (2023.01); *H04W 4/025* (2013.01); *H04W 4/06* (2013.01); *H04W 88/06* (2013.01); *H04W 76/10* (2018.02)

(58) Field of Classification Search
CPC ... H04W 68/005; H04W 48/16; H04W 48/18; H04W 76/40; H04W 36/08;
(Continued)

(56) References Cited

U.S. PATENT DOCUMENTS

| 7,885,199 | B2 | 2/2011 | Mooney et al. |
| 8,682,243 | B2 * | 3/2014 | Bienas .................. H04W 48/18 455/13.1 |

(Continued)

FOREIGN PATENT DOCUMENTS

| CN | 101163260 A | 4/2008 |
| CN | 101204104 A | 6/2008 |

(Continued)

OTHER PUBLICATIONS

"IEEE Recommended Practice for Network Reference Model and Functional Description of IEEE 802(R) Access Network," in IEEE Std 802.1CF-2019 , vol., No., pp. 1-185, May 31, 2019, doi: 10.1109/IEEESTD.2019.8726453. (Year: 2019).*

(Continued)

*Primary Examiner* — William D Cumming
(74) *Attorney, Agent, or Firm* — ArentFox Schiff LLP

(57) ABSTRACT

A mode switching method for a broadcast service is provided. A trigger instruction is determined when switching of a broadcast mode is to be performed. The trigger instruction is configured to instruct switching of the broadcast mode of a terminal. The trigger instruction is transmitted to an access network device to enable the access network device to transmit a switching request to a functional network element. The switching request is configured to instruct the functional network element to configure a corresponding mode parameter. The mode parameter is configured to instruct the access network device to update an execution parameter, to obtain a configuration parameter and to transmit the configuration parameter to the terminal. Switching to a corresponding broadcast mode is performed according to the configuration parameter to establish a wireless connection with the access network device.

16 Claims, 5 Drawing Sheets

(51) Int. Cl.
*H04W 4/06* (2009.01)
*H04W 76/10* (2018.01)
*H04W 88/06* (2009.01)

(58) Field of Classification Search
CPC ............... H04W 36/087; H04W 72/30; H04W 74/0808; H04W 72/23; H04W 84/18; H04W 24/10
USPC .................... 455/7, 13.1, 41.2; 370/329, 331
See application file for complete search history.

(56) References Cited

U.S. PATENT DOCUMENTS

| | | | |
|---|---|---|---|
| 8,730,860 B2 | 5/2014 | Lohmar et al. | |
| 9,826,502 B2 | 11/2017 | Cherian et al. | |
| 10,158,980 B2 | 12/2018 | Wang et al. | |
| 10,992,752 B2* | 4/2021 | Graefe | H04W 84/18 |
| 11,071,089 B2* | 7/2021 | Chandramouli | H04W 76/40 |
| 11,095,482 B2* | 8/2021 | Zhang | H04L 1/0026 |
| 11,095,483 B2* | 8/2021 | Zhang | H04W 24/10 |
| 11,153,721 B2* | 10/2021 | Graefe | G08G 1/096791 |
| 11,452,032 B2* | 9/2022 | Gupta | H04W 4/021 |
| 11,582,664 B2* | 2/2023 | Liu | H04W 48/16 |
| 11,653,292 B2* | 5/2023 | Azizi | H04L 67/60 370/329 |
| 11,800,439 B2* | 10/2023 | Azizi | G06F 9/5072 |
| 2007/0177592 A1 | 8/2007 | Mooney et al. | |
| 2009/0196213 A1 | 8/2009 | Zhong et al. | |
| 2009/0219848 A1 | 9/2009 | Lohmar et al. | |
| 2012/0238208 A1* | 9/2012 | Bienas | H04W 68/005 455/41.2 |
| 2013/0028118 A1 | 1/2013 | Cherian et al. | |
| 2013/0029588 A1* | 1/2013 | Bienas | H04W 48/18 455/7 |
| 2016/0323719 A1 | 11/2016 | Wang et al. | |
| 2017/0374581 A1 | 12/2017 | Dao | |
| 2018/0139665 A1 | 5/2018 | Park et al. | |
| 2019/0132709 A1* | 5/2019 | Graefe | G08G 1/0133 |
| 2019/0222652 A1* | 7/2019 | Graefe | H04L 67/12 |
| 2019/0273637 A1* | 9/2019 | Zhang | H04B 5/72 |
| 2019/0327115 A1* | 10/2019 | Zhang | H04W 72/23 |
| 2019/0364492 A1* | 11/2019 | Azizi | H04W 48/18 |
| 2020/0100213 A1* | 3/2020 | Chandramouli | H04L 65/70 |
| 2020/0205062 A1* | 6/2020 | Azizi | H04L 69/24 |
| 2020/0267513 A1 | 8/2020 | Zhu et al. | |
| 2021/0314836 A1* | 10/2021 | Liu | H04W 48/18 |
| 2022/0053456 A1* | 2/2022 | Lei | H04W 72/30 |
| 2022/0182793 A1* | 6/2022 | Graefe | H04W 4/06 |
| 2022/0312501 A1* | 9/2022 | Lei | H04L 1/1867 |
| 2022/0369182 A1* | 11/2022 | Gundavelli | H04W 36/00835 |
| 2022/0407650 A1* | 12/2022 | Miao | H04L 5/0094 |
| 2023/0095560 A1* | 3/2023 | Stefanatos | H04W 74/0808 370/329 |
| 2023/0098868 A1* | 3/2023 | Liu | H04W 48/16 370/331 |
| 2023/0138578 A1* | 5/2023 | Azizi | H04W 92/045 370/329 |
| 2023/0345509 A1* | 10/2023 | Kadiri | H04W 72/30 |
| 2023/0377460 A1* | 11/2023 | Sivanesan | G08G 1/143 |
| 2024/0073796 A1* | 2/2024 | Azizi | G06F 9/5072 |

FOREIGN PATENT DOCUMENTS

| | | | | |
|---|---|---|---|---|
| CN | 102870461 A | | 1/2013 | |
| CN | 103797873 A | | 5/2014 | |
| CN | 104754522 A | | 7/2015 | |
| CN | 105684473 A | | 6/2016 | |
| CN | 109417733 A | | 3/2019 | |
| CN | 109769150 A | | 5/2019 | |
| CN | 110167190 A | | 8/2019 | |
| CN | 110662270 A | | 1/2020 | |
| CN | 110809299 A | | 2/2020 | |
| EP | 2698004 A2 | | 2/2014 | |
| JP | 2014515227 A | | 6/2014 | |
| WO | WO-2017131690 A1 * | | 8/2017 | ......... H04L 12/1881 |

OTHER PUBLICATIONS

"LS on aspect of Mission Critical Services over 5MBS", SA WG2 Meeting #S2-135, S2-1908726 published Sep. 10, 2019 (1 page).
Office Action dated Mar. 2, 2021 issued in corresponding application CN201911083105.7 (with English translation) (7 pages).
International Search Report and Written Opinion dated Jan. 4, 2021 issued in corresponding patent application No. PCT/CN2020/118250 (with English translation) (14 pages).
Supplementary European Search Report in 20885325.9, mailed Aug. 31, 2022, 17 pages.
OPPO: "Solution for broadcast and unicast switching", 3GPP Draft; S2-2000328, 3GPP, vol. SA WG2, No. Incheon, Korea; Jan. 13, 2020-Jan. 17, 2020, Jan. 7, 2020.
1 Japanese Office Action in 2022-515498, mailed Mar. 7, 2023, with English Translation, 7 pages.

* cited by examiner

MODE SWITCHING METHOD FOR BROADCAST SERVICE AND RELATED DEVICE

RELATED APPLICATIONS

This application is a continuation of International Application No. PCT/CN2020/118250, entitled "MODE SWITCHING METHOD FOR BROADCASTING SERVICES AND RELATED DEVICE" and filed on Sep. 28, 2020, which claims priority to Chinese Patent Application No. 201911083105.7, entitled "MODE SWITCHING METHOD FOR BROADCAST SERVICE AND RELATED DEVICE" filed on Nov. 7, 2019. The entire disclosures of the prior applications are hereby incorporated by reference in their entirety.

FIELD OF THE TECHNOLOGY

This disclosure relates to the field of computer technologies, including to mode switching technologies for a broadcast service.

BACKGROUND OF THE DISCLOSURE 5G broadcast is a technical feature introduced into 5G. The purpose is to support broadcast services by enhancing New Radio (NR) and 5GC; 5G broadcast technologies have broad prospects of applications in the future, including: broadcast of big live shows, transmission of common service data in the Internet of Vehicles, pushing of software update, TV programs, and the like.

However, in order to use radio resources flexibly and efficiently, and meet a requirement of mobility management in a 5G system, switching between a broadcast mode and a unicast mode needs to be supported. For the switching between the broadcast mode and the unicast mode in the broadcast service, it is generally necessary to disconnect a terminal from a network side first, then reconfigure a parameter, and then re-establish a session.

However, the foregoing re-establishment process causes an interruption of the broadcast service, affects performance of the broadcast service, and reduces flexibility of the broadcast service.

SUMMARY

Embodiments of this disclosure provide a switching method for a broadcast service and a related device, which can improve performance of the broadcast service and improve flexibility of the broadcast service.

In view of this, a first aspect of this disclosure provides a mode switching method for a broadcast service. The mode switching method is applicable to a 5G network architecture system or a 5G broadcast application process for example. In the method, a trigger instruction is determined when switching of a broadcast mode is to be performed. The trigger instruction is configured to instruct switching of the broadcast mode of a terminal. The trigger instruction is transmitted to an access network device to enable the access network device to transmit a switching request to a functional network element. The switching request is configured to instruct the functional network element to configure a corresponding mode parameter. The mode parameter is configured to instruct the access network device to update an execution parameter, to obtain a configuration parameter and to transmit the configuration parameter to the terminal. Switching to a corresponding broadcast mode is performed according to the configuration parameter to establish a wireless connection with the access network device.

A second aspect of this disclosure provides a mode switching method for a broadcast service. In the method, switching information of a broadcast mode is obtained to determine a trigger instruction. The trigger instruction is transmitted to a functional network element. The trigger instruction is configured to instruct the functional network element to configure a corresponding mode parameter. The mode parameter is used by an access network device to update an execution parameter, to obtain a configuration parameter and to transmit the configuration parameter to the terminal.

A third aspect of this disclosure provides a mode switching method for a broadcast service. In the method, a trigger instruction is obtained. The trigger instruction is from an access network device, or from an application server, or determined by a functional network element based on a preset rule. The preset rule is determined based on a network resource utilization or configuration of a broadcast mode by a device on a downlink transmission path. A corresponding broadcast mode is determined according to the trigger instruction. An execution parameter is updated according to the broadcast mode to obtain a configuration parameter. The configuration parameter is transmitted to the access network device to instruct the access network device to establish a connection with a terminal based on the configuration parameter.

A fourth aspect of this disclosure provides a terminal. The terminal includes circuitry configured to determine a trigger instruction when switching of a broadcast mode is to be performed. The trigger instruction is configured to instruct switching of the broadcast mode of a terminal. The trigger instruction is transmitted to an access network device to enable the access network device to transmit a switching request to a functional network element. The switching request is configured to instruct the functional network element to configure a corresponding mode parameter. The mode parameter is configured to instruct the access network device to update an execution parameter, to obtain a configuration parameter and to transmit the configuration parameter to the terminal. The circuitry is configured to switch to a corresponding broadcast mode according to the configuration parameter to establish a wireless connection with the access network device.

A fifth aspect of this disclosure provides an application server including circuitry. The circuitry is configured to obtain switching information of a broadcast mode to determine a trigger instruction. The circuitry is configured to transmit the trigger instruction to a functional network element, the trigger instruction being configured to instruct the functional network element to configure a corresponding mode parameter, the mode parameter being used by an access network device to update an execution parameter, to obtain a configuration parameter and to transmit the configuration parameter to the terminal.

A sixth aspect of this disclosure provides a functional network element including circuitry. The circuitry is configured to obtain a trigger instruction, the trigger instruction being from an access network device, or from an application server, or being determined by the functional network element based on a preset rule, and the preset rule being determined based on a network resource utilization or configuration of a broadcast mode by a device on a downlink transmission path. The circuitry is configured to determine a corresponding broadcast mode according to the trigger instruction. The circuitry is configured to update an execution parameter according to the broadcast mode to obtain a configuration parameter. Further, the circuitry is configured to transmit the configuration parameter to the access network device to instruct the access network device to establish a connection with a terminal based on the configuration parameter.

A seventh aspect of this disclosure provides a computer device, including: a memory, a processor, and a bus system, the memory being configured to store a program code, the processor being configured to perform the mode switching method according to the foregoing first aspect or any implementation of the foregoing first aspect according to instructions in the program code, the processor being further configured to perform the mode switching method according to the foregoing second aspect or any implementation of the foregoing second aspect according to instructions in the program code, the processor being further configured to perform the mode switching method according to the foregoing third aspect or any implementation of the foregoing third aspect according to instructions in the program code.

An eighth aspect of this disclosure provides a non-transitory computer-readable storage medium storing instructions which when executed by a processor cause the processor to perform the mode switching method according to the foregoing first aspect or any implementation of the foregoing first aspect, or the mode switching method according to the foregoing second aspect or any implementation of the foregoing second aspect, or the mode switching method according to the foregoing third aspect or any implementation of the third aspect.

A ninth of this disclosure provides a computer program product, including instructions, the instructions, when run on a computer, causing the computer to perform the mode switching method for a broadcast service according to any implementation of the foregoing first aspect, or the mode switching method for a broadcast service according to any implementation of the foregoing second aspect, or the mode switching method for a broadcast service according to any implementation of the foregoing third aspect.

According to the foregoing technical solutions, the embodiments of this disclosure can include the following advantages: a terminal establishes trigger coordination with an application server to determine a trigger instruction, the trigger instruction being used for instructing switching of a broadcast mode of the terminal; then, an access network device is enabled to transmit a switching request to a functional network element according to the trigger instruction, and the functional network element configures a corresponding mode parameter according to the switched mode and updates an execution parameter, to obtain a configuration parameter and to transmit the configuration parameter to the terminal; then, the terminal switches to a corresponding broadcast mode according to the configuration parameter to establish a wireless connection with the access network device. This enables a communication system to switch between the broadcast mode and a multicast mode, achieves support for service flexibility, and improves fluency of a communication process.

BRIEF DESCRIPTION OF THE DRAWINGS

To describe the technical solutions in the embodiments of this disclosure more clearly, the following briefly describes the accompanying drawings required for describing the embodiments. The accompanying drawings in the following description show merely some embodiments of this disclosure and a person of ordinary skill in the art may still derive other accompanying drawings from the accompanying drawings.

DESCRIPTION OF EMBODIMENTS

The embodiments of this disclosure provide a mode switching method for a broadcast service, applicable to a system or a program application. A terminal establishes trigger coordination with an application server to determine a trigger instruction, the trigger instruction being used for instructing switching of a broadcast mode of the terminal; then, an access network device is enabled to transmit a switching request to a functional network element according to the trigger instruction, and the functional network element configures a corresponding mode parameter according to a switched mode and updates an execution parameter, to obtain a configuration parameter and to transmit the configuration parameter to the terminal; then, the terminal switches to a corresponding broadcast mode according to the configuration parameter to establish a wireless connection with the access network device. This enables a communication system to switch between the broadcast mode and a multicast mode, achieves support for service flexibility, and improves fluency of a communication process.

The terms such as "first", "second", "third", and "fourth" (if any) in the specification and claims of this disclosure and in the accompanying drawings are used for distinguishing similar objects and not necessarily used for describing any particular order or sequence. It is to be understood that data used in this way can be modified in various embodiments, so that the embodiments of the present disclosure described herein can be implemented in an order different from the order shown or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Figure 1:
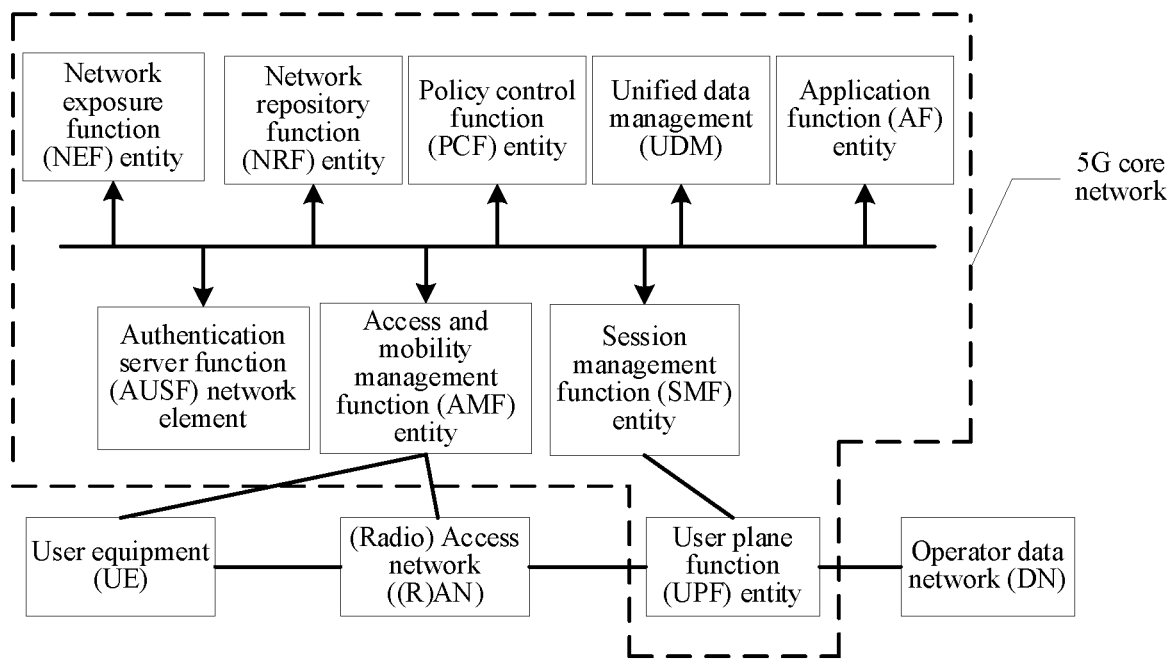
FIG. 1 is a network architecture diagram of a 5G core network according to an embodiment of this disclosure.

It is to be understood that the mode switching method for a broadcast service according to this disclosure is applicable to a 5G network architecture, as shown in FIG. 1 which is a network architecture diagram of a 5G core network according to an embodiment of this disclosure, including: a network exposure function (NEF) entity, a network repository function (NRF) entity, a policy control function (PCF)

entity, a unified data management (UDM) network element, an application function (AF) entity, an authentication server function (AUSF) network element, an access and mobility management function (AMF) entity, a session management function (SMF) entity, and a user plane function (UPF) entity, and there may be one or more of the network elements, entities or devices.

The NEF entity is configured to connect other network elements in the core network with an external application server of the core network, and to provide a service such as authentication and data forwarding when the external application server initiates a service request to the core network, so as to provide network capability information to the external application server, or to provide information about the external application server to the network elements of the core network. In an implementation of this disclosure, in a case of data transmission between the AF entity and the network element of the core network or the access network device, for example, the PCF entity, the NEF entity may forward the data.

The NRF entity supports a service discovery function. That is, the NRF entity receives an NF-Discovery-Request transmitted by the network element, and then provides discovered network element information to a requester. The NRF further maintains a feature of an available network element instance and supported service capability.

The PCF entity mainly supports a unified policy framework to control network behaviors, provides a policy rule to a control layer network function, and is responsible for obtaining user subscription information related to a policy decision.

The main functions of the UDM network element are: 1) to generate a 3GPP authentication certificate/authentication parameter; 2) to store and to manage a permanent user identity of a 5G system; 3) to manage subscription information; 4) to deliver MT-SMS; 5) to manage SMS; 6) to manage registration of a serving network element of a user (e.g., the AMF entity or SMF entity that currently provides a service to a terminal).

The AF entity is specifically an application server corresponding to an application. The AF entity has an application service function and interacts with the network element of the core network to provide a service to a terminal device. For example, the AF entity interacts with the PCF entity to perform service policy control, interacts with the NEF entity to obtain network capability information or to provide application information to a network, or interacts with the PCF entity to provide data network access point information to the PCF entity to generate routing information of a corresponding data service by the PCF entity.

The AUSF network element supports authentication of 3GPP access and authentication of untrusted non 3GPP access.

The AMF entity is mainly responsible for authentication of a terminal device, mobility management of a terminal device, network slice selection, and selection of a session management function entity, and the like.

The SMF entity is mainly responsible for a control plane function of UE session management, including: UPF selection, IP address allocation, QoS management of a session, and obtaining a policy control and charging (PCC) policy (from the PCF entity), and the like.

The UPF entity is mainly responsible for routing and forwarding of a packet and quality of service (QoS) flow mapping.

It is to be understood that the functional network element of this disclosure may be one of or a combination of functions of the foregoing function entities, and the specific function entity used herein depends on an actual application. In this embodiment, a 5G broadcast service is used for the description.

A RAN may be a network including a plurality of RAN devices, which implements a wireless physical layer function, resource scheduling and radio resource management, radio access control, and a mobility management function. The RAN device is connected to the UPF entity via a user plane interface N3 and is configured to transmit data of a terminal device. The RAN device establishes a control plane signaling connection with the AMF entity via a control plane interface N2 to implement functions such as radio access bearer control. FIG. 1 of this disclosure shows a radio access network device, that is, the RAN device, which may also be replaced by a wired access network device.

A user equipment (UE), for example, a handheld device or an in-vehicle device with a wireless connection function, is configured to provide voice/data connectivity to a user. The UE may also include a smart mobile phone, a mobile station (MS), a mobile terminal (MT), and the like, which may also be referred to as a terminal in the following description.

In the related art, in order to use radio resources flexibly and efficiently and meet a requirement of mobility management in the 5G system, the switching between a broadcast mode and a unicast mode needs to be supported. For the switching between the broadcast mode and the unicast mode in the broadcast service, it is generally necessary to disconnect a terminal from a network side first, then reconfigure a parameter, and then further re-establish a session.

However, during deployment of the 5G network, the radio access network needs to be upgraded or redeployed, so full coverage is difficult to achieve. In the future 5G network, a terminal supporting broadcast is not limited to a TV, but also includes a smart terminal and an in-vehicle mobile terminal of the user. In a case that mode switching is not supported, connection is interrupted and service performance is affected. Even if a mobility requirement is not considered, that is, in a case that the terminal does not move, the most suitable radio transmission mode also changes as the number of available radio resources changes and the service needs of the user change. That is, the switching between the unicast mode and the broadcast mode may still be needed.

Therefore, the 5G network needs to resolve problems of mode switching and connection management to perform the mode switching flexibly when mobility or a service flow feature changes.

Figure 2:
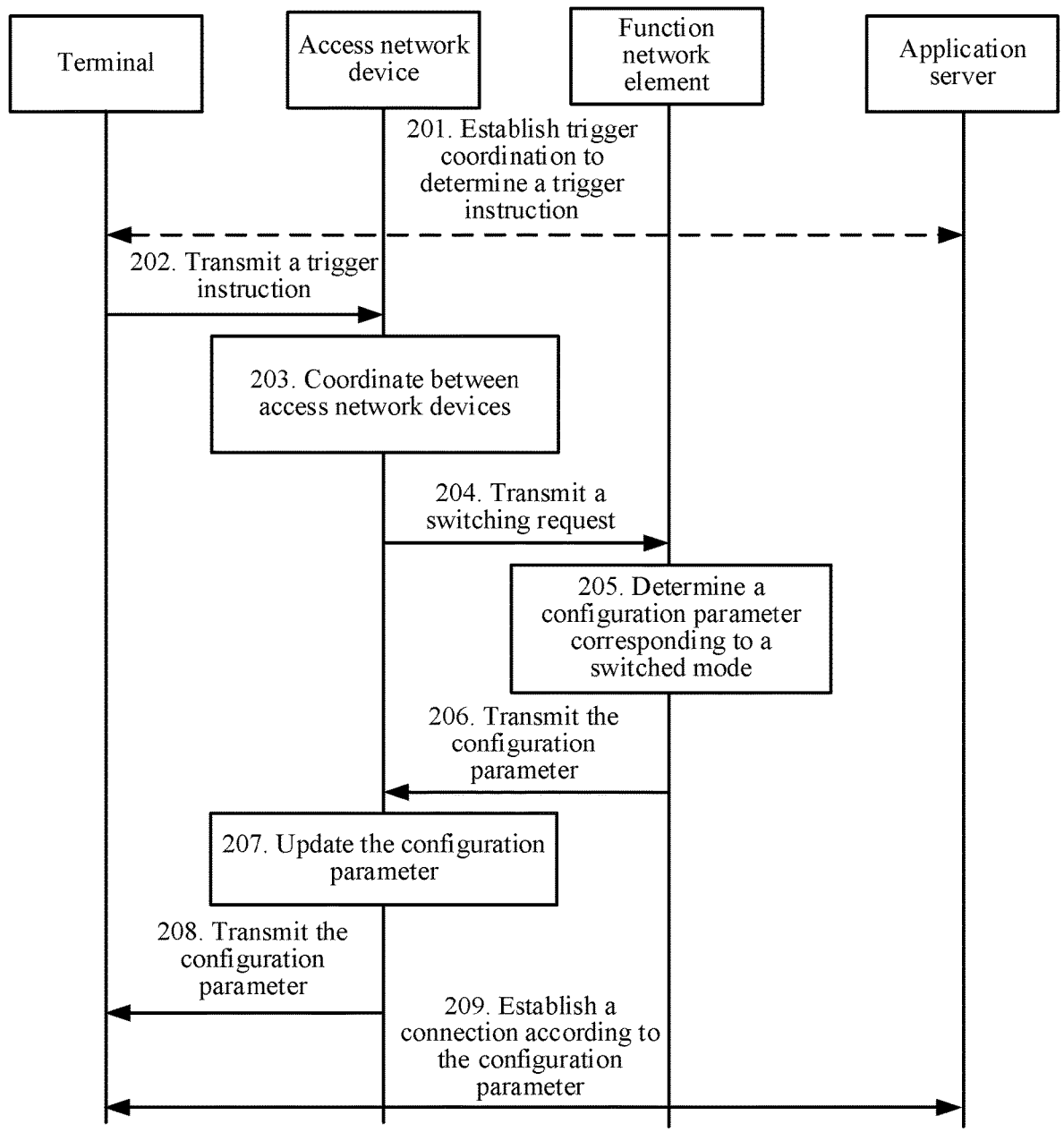
FIG. 2 is a flowchart of a mode switching method for a broadcast service according to an embodiment of this disclosure.

In order to resolve the foregoing problems, this disclosure proposes a mode switching method for a broadcast service. Under the foregoing 5G network architecture, the following describes the mode switching method for a broadcast service according to this disclosure. FIG. 2 is a flowchart of a mode switching method for a broadcast service according to an embodiment of this disclosure, and the embodiment of this disclosure can at least include the following steps:

In step 201, a terminal establishes trigger coordination with an application server to determine a trigger instruction.

In this embodiment, the process that the terminal establishes the trigger coordination with the application server indicates that it is determined that mode switching in 5G broadcast occurs, and the trigger instruction corresponding to the mode switching is generated.

In a possible scenario, the mode switching may be initiated by the terminal. Specifically, on the application layer, the terminal may monitor application layer information in real time to obtain switching information. The switching information is determined based on a change of a geographic location or of a service policy. For example: when the switching information is determined based on the change of the geographic location, the terminal monitors its own location change in real time. When the location change exceeds a distance threshold, the trigger instruction used for instructing the broadcast mode switching is generated. Because micro base stations are densely distributed in the 5G network, the distance threshold may be determined according to the distribution of the base stations around a location of the terminal. When the switching information is determined based on the change of the service policy, the terminal obtains its own service execution status. When a node for performing the broadcast service switching is detected, the trigger instruction used for instructing the broadcast mode switching is generated.

In addition, in the scenario where the mode switching is initiated by the terminal, the mode switching may also be performed according to the terminal-side communication protocol. Specifically, the terminal obtains a measurement report of a neighboring cell, the measurement report including a broadcast mode supported by the neighboring cell, and then the terminal determines the corresponding broadcast mode according to the measurement report to determine the trigger instruction. For example, triggering for an AS layer is based on the measurement report and cell discovery. For example, a serving cell supports broadcast, but a neighboring cell does not. Therefore, when the terminal moves and causes the mode switching, the penalty is implemented by RRC signaling. If triggering is performed for a NAS layer, the terminal is made to decide to initiate a mode change by an application layer of the terminal or in other manners, which may be implemented at the NAS layer by modifying a NAS service request message or by defining a new NAS message. The foregoing can be implemented by revising a standard protocol for a terminal communication process.

In another possible scenario, the mode switching may be initiated by an application server. Specifically, the terminal receives the switching information transmitted by the application server, and determines the trigger instruction according to the switching information. That is, the switching information is generated by the application server side. A specific generation process may be based on a program policy corresponding to the application server, or background application update performed by a related person, and the like. The specific form depends on the actual scenario.

In step 202, the terminal transmits the trigger instruction to an access network device.

In this embodiment, the trigger instruction may include selection of a specific mode or parameter configuration corresponding to the mode, or may include only an identifier of a mode to be analyzed by an access network side. Specifically, the trigger instruction may be an RRC message, an enhanced measurement report, or a newly defined RRC message. The specific form depends on the actual scenario. The access network device may be a combination of a plurality of NR-RAN gNBs.

In step 203, coordination between access network devices is performed.

In this embodiment, coordination between access network devices is to determine whether a plurality of neighboring cells can be configured as a broadcast cell group. There may be one or more cells in the broadcast cell group, and whether the broadcast cell group can be configured depends on base station capability and resource status. Then, the available access network device is determined according to the negotiation. It is to be understood that coordination between access network devices needs to be implemented based on messages between base stations, for example, by enhancing existing Xn interface messages.

In step 204, the access network device transmits a switching request to a functional network element.

In this embodiment, the functional network element is one or more function entities configured to perform the 5G broadcast function in the core network. The specific number depends on the actual scenario.

In step 205, the functional network element determines a configuration parameter corresponding to the switched mode.

In this embodiment, the configuration parameter is a parameter setting corresponding to the switched mode. A corresponding parameter used when the functional network element executes a previous mode is an execution parameter. In the modification process, the execution parameter may be deleted and then the configuration parameter is input, or the execution parameter may be adjusted to obtain the configuration parameter. The specific form depends on the actual scenario.

In step 206, the functional network element transmits the configuration parameter to the access network device.

In this embodiment, on a control plane, the functional network element related to a broadcast service in the core network transmits a switching reply message to a NG-RAN, where the message contains the configuration parameter corresponding to a to-be-switched mode. On a user plane, when the corresponding access network device to which the configuration parameter is provided changes, the core network needs to perform device association update in an uplink direction, and to reconfigure a wireless side protocol stack SDAP, PDCP, RLC and MAC. The configuration of each layer may be implemented in a delta manner or a full reconfiguration manner.

In step 207, the access network device updates the configuration parameter.

In this embodiment, the access network device NR-RAN gNB changes the configuration parameter.

In step 208, the access network device transmits the configuration parameter to the terminal.

In this embodiment, after changing the configuration parameter, the access network device NR-RAN gNB transmits an RRC message to the terminal to perform switching.

In step 209, a connection is established according to the configuration parameter.

In this embodiment, after the RRC message is transmitted to the terminal side, the terminal and the access network device re-establish a wireless connection according to the new configuration parameter.

It is to be understood that the access network device for re-establishing the connection may be the access network device corresponding to the mode before the switching, or the access network device corresponding to the switched mode, and the two may be the same access network device or different access network devices.

According to the foregoing embodiment, it can be recognized that, a terminal establishes trigger coordination with an application server to determine a trigger instruction, the trigger instruction being used for instructing switching of a broadcast mode of the terminal; then, an access network device is enabled to transmit a switching request to a functional network element according to the trigger instruction, and the functional network element configures a corresponding mode parameter according to a switched mode and updates an execution parameter, to obtain a configuration parameter and to transmit the configuration parameter to the terminal; then, the terminal switches to a corresponding broadcast mode according to the configuration parameter to establish a wireless connection with the access network device. This enables a communication system to switch between the broadcast mode and the multicast mode, achieves support for service flexibility, and improves fluency of a communication process.

Figure 3:
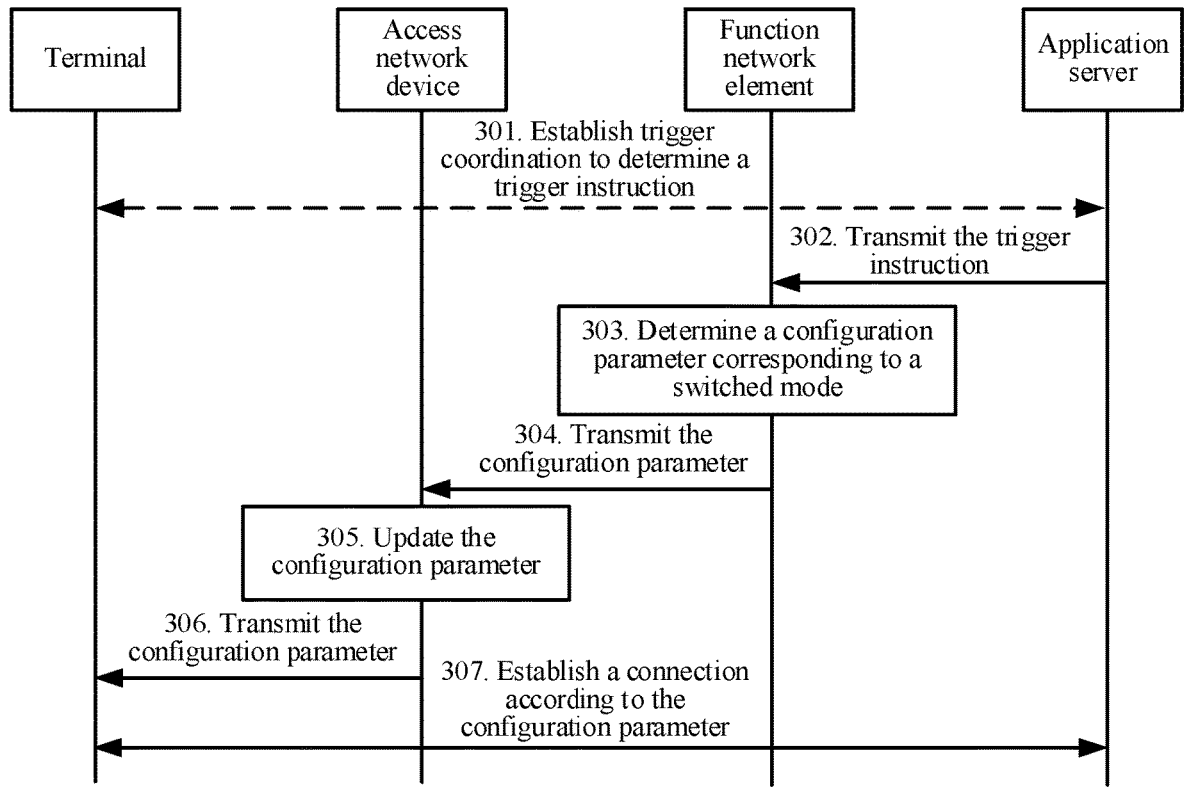
FIG. 3 is a flowchart of another mode switching method for a broadcast service according to an embodiment of this disclosure.

The foregoing embodiment describes the mode switching process of the 5G broadcast service initiated by the terminal. In another scenario, the mode switching of the 5G broadcast service may be initiated by the application server. The following describes the scenario. FIG. 3 is a flowchart of another mode switching method for a broadcast service according to an of this disclosure, and the embodiment of this disclosure can at least include the following steps:

In step 301, an application server establishes trigger coordination with a terminal to determine a trigger instruction.

In this embodiment, the process that the terminal establishes the trigger coordination with the application server indicates that it is determined that mode switching in 5G broadcast occurs, and the trigger instruction corresponding to the mode switching is generated.

In a possible scenario, the mode switching may be initiated by the application server. Specifically, the application server obtains switching information of the broadcast mode to determine the trigger instruction, where the switching information may be generated by the application server according to a policy of a related application or may be generated during a response process of active mode switching by a related person.

In another possible scenario, the mode switching may be initiated by the terminal. That is, the application server receives switching information transmitted by the terminal, and then determines the trigger instruction. Specifically, the switching information may be determined by the terminal according to a change of a geographic location or of a service policy. Reference may be made to the related description of determining the switching information by the terminal in step 201 of FIG. 2 as an example, and details are not described herein again.

In step 302, the application server transmits the trigger instruction to a functional network element.

In this embodiment, the application server may transmit a message to the functional network element in the core network (or via the NEF) to trigger the switching.

It is to be understood that the core network element can also perform the mode switching operation based on information it detects. For example, when resource optimization is performed, service broadcast originally supported by a broadcast group including three cells may be switched to a unicast mode to provide service transmission if the number of users decreases and a resource utilization of broadcast is not high, and vice versa.

In addition, the switching may also be performed based on route reconfiguration, that is, in a direction from the terminal to the access network device and then to the server, or in the opposite direction. The route through which the service transmission passes may change, and on the changed path, the functional network element which originally supports broadcast may not support broadcast after the change. In this case, the broadcast needs to be switched to the unicast.

In step 303, the functional network element determines a configuration parameter corresponding to the switched mode.

In step 304, the functional network element transmits the configuration parameter to the access network device.

In step 305, the access network device updates the configuration parameter.

In step 306, the access network device transmits the configuration parameter to the terminal.

In step 307, a connection is established according to the configuration parameter.

In this embodiment, steps 303-307 are similar to steps 205-209 in FIG. 2. Reference may be made to the specific description above as examples, and details are not described herein again.

Figure 4:
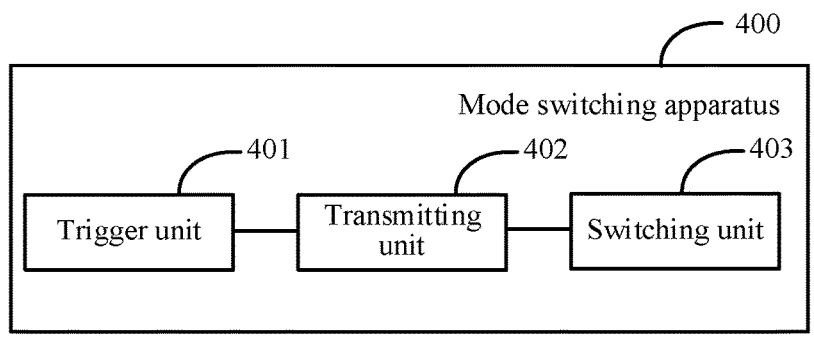
FIG. 4 is a schematic structural diagram of a mode switching apparatus according to an embodiment of this disclosure.

In order to better implement the foregoing solutions according to the embodiments of this disclosure, the following provides related apparatuses configured to implement the foregoing solutions. FIG. 4 is a schematic structural diagram of a mode switching apparatus according to an embodiment of this disclosure. The mode switching apparatus 400 can include a trigger unit 401, a transmitting unit 402, and a switching unit 403. One or more modules, submodules, and/or units of the apparatus can be implemented by processing circuitry, software, or a combination thereof, for example.

The trigger unit 401 is configured to establish trigger coordination with an application server to determine a trigger instruction, the trigger instruction being used for instructing switching of a broadcast mode of the terminal.

The transmitting unit 402 is configured to transmit the trigger instruction to an access network device to enable the access network device to transmit a switching request to a functional network element, the switching request being used for instructing the functional network element to configure a corresponding mode parameter, the mode parameter being used for instructing the access network device to update an execution parameter, to obtain a configuration parameter and to transmit the configuration parameter to the terminal.

The switching unit 403 is configured to switch to a corresponding broadcast mode according to the configuration parameter to establish a wireless connection with the access network device.

In some possible implementations of this disclosure, the trigger unit 401 is specifically configured to monitor application layer information in real time to obtain switching information, the switching information being determined based on a change of a geographic location or of a service policy. The trigger unit 401 can be specifically configured to determine the trigger instruction according to the switching information.

In some possible implementations of this disclosure, the trigger unit 401 is specifically configured to receive the switching information transmitted by the application server. The trigger unit 401 can be specifically configured to determine the trigger instruction according to the switching information.

In some possible implementation of this disclosure, the trigger unit 401 is specifically configured to obtain a measurement report of a neighboring cell, the measurement report including a broadcast mode supported by the neighboring cell. The trigger unit 401 can be specifically configured to determine the corresponding broadcast mode according to the measurement report to determine the trigger instruction.

In some possible implementations of this disclosure, the transmitting unit 402 is specifically configured to determine a corresponding parameter change value according to the switching of the broadcast mode to generate resource control information. The transmitting unit 402 can be specifically configured to transmit the trigger instruction to the access network device, the trigger instruction including the resource control information, to enable the access network device to negotiate among a plurality of neighboring access network devices according to the resource control information, to match the switched broadcast mode and to transmit the switching request to the functional network element.

A terminal establishes trigger coordination with an application server to determine a trigger instruction, the trigger instruction being used for instructing switching of a broadcast mode of the terminal; then, an access network device is enabled to transmit a switching request to a functional network element according to the trigger instruction, and the functional network element configures a corresponding mode parameter according to a switched mode and updates an execution parameter, to obtain a configuration parameter and to transmit the configuration parameter to the terminal; then, the terminal switches to a corresponding broadcast mode according to the configuration parameter to establish a wireless connection with the access network device. This enables a communication system to switch between the broadcast mode and a multicast mode, achieves support for service flexibility, and improves fluency of a communication process.

Figure 5:
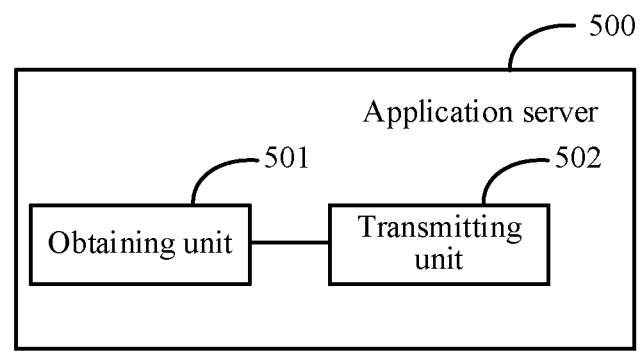
FIG. 5 is a schematic structural diagram of an application server according to an embodiment of this disclosure.

This embodiment further provides an application server, as shown in FIG. 5, which is a schematic structural diagram of a server according to an embodiment of this disclosure. The server can include an obtaining unit 501 and a transmitting unit 502. One or more modules, submodules, and/or units of the apparatus can be implemented by processing circuitry, software, or a combination thereof, for example.

The obtaining unit 501 is configured to obtain switching information of a broadcast mode to determine a trigger instruction.

The transmitting unit 502 is configured to transmit the trigger instruction to a functional network element, the trigger instruction being used for instructing the functional network element to configure a corresponding mode parameter, the mode parameter being used for instructing the access network device to update an execution parameter, to obtain a configuration parameter and to transmit the configuration parameter to a terminal.

In some possible implementations of this disclosure, the obtaining unit 501 is specifically configured to receive the switching information transmitted by the terminal, the switching information being determined based on a change of a geographic location or of a service policy. The obtaining unit 501 can be specifically configured to determine the trigger instruction according to the switching information.

Figure 6:
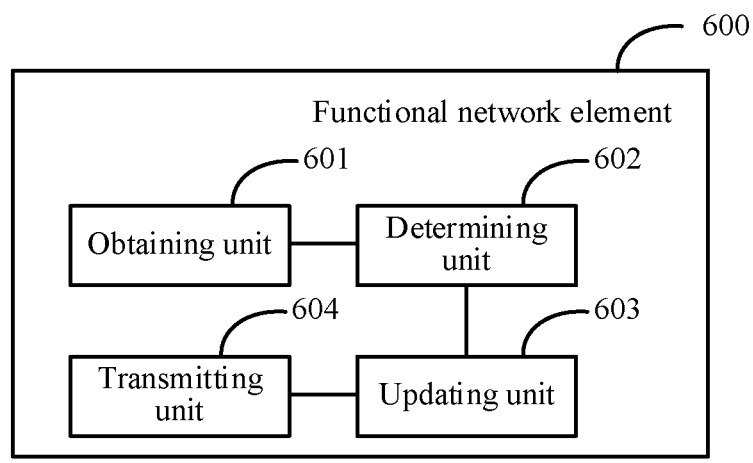
FIG. 6 is a schematic structural diagram of a functional network element according to an embodiment of this disclosure.

This embodiment further provides a functional network element, as shown in FIG. 6, which is a schematic structural diagram of the functional network element according to an embodiment of this disclosure. The server can include an obtaining unit 601, a determining unit 602, an updating unit 603, and a transmitting unit 604. One or more modules, submodules, and/or units of the apparatus can be implemented by processing circuitry, software, or a combination thereof, for example.

The obtaining unit 601 is configured to obtain a trigger instruction, the trigger instruction being from an access network device, or from an application server, or being determined by the functional network element based on a preset rule, the preset rule being determined based on a network resource utilization or configuration of a broadcast mode by a device on a downlink transmission path.

The determining unit 602 is configured to determine a corresponding broadcast mode according to the trigger instruction.

The updating unit 603 is configured to update an execution parameter according to the broadcast mode to obtain a configuration parameter.

The transmitting unit 604 is configured to transmit the configuration parameter to the access network device to instruct the access network device to establish a connection with a terminal based on the configuration parameter.

Figure 7:
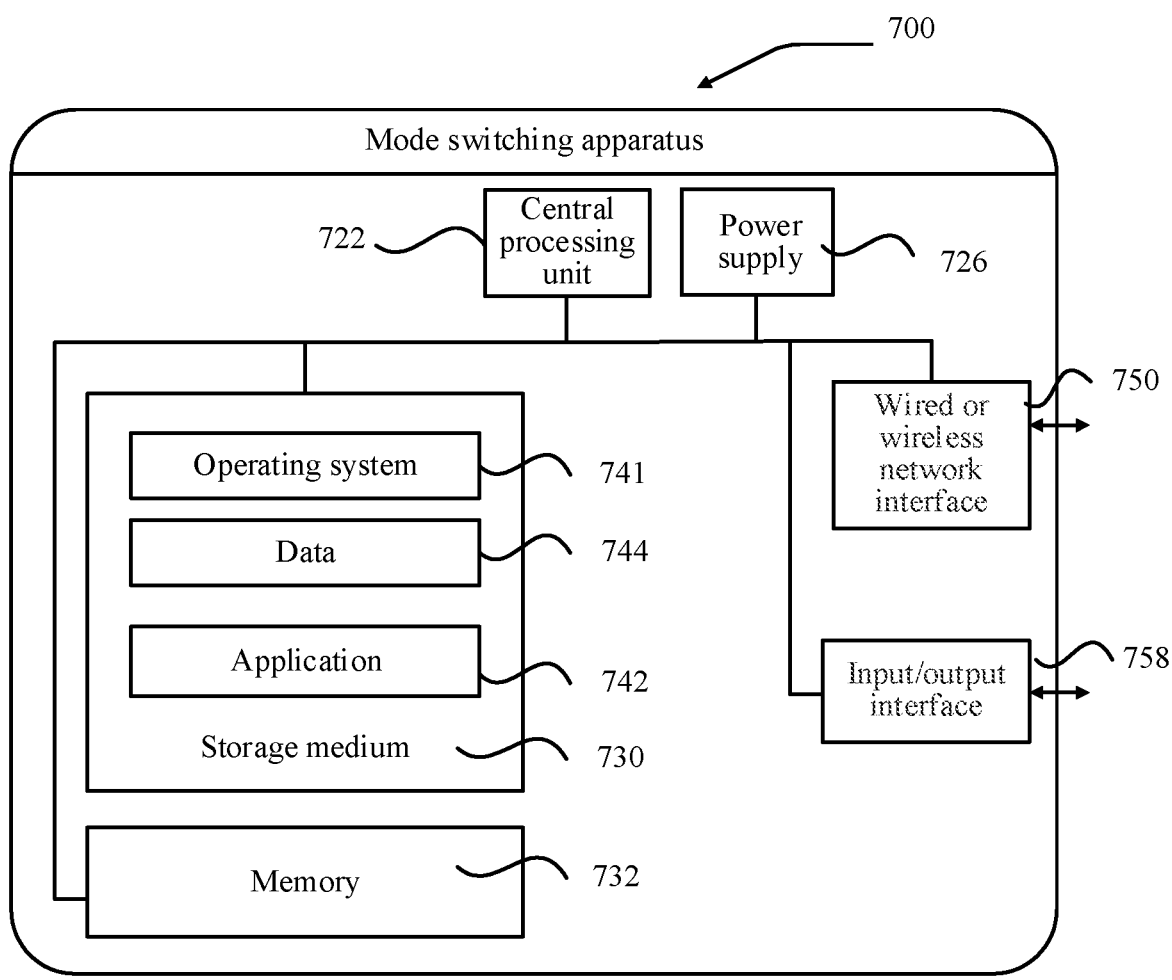
FIG. 7 is a schematic structural diagram of another mode switching apparatus according to an embodiment of this disclosure.

An embodiment of this disclosure further provides a mode switching apparatus for a broadcast service. FIG. 7 is a schematic structural diagram of another mode switching apparatus according to an embodiment of this disclosure. The mode switching apparatus 700 may vary greatly because of different configurations or performance, and may include processing circuitry such as one or more central processing units (CPUs) 722 (e.g., one or more processors) and a memory 732, and one or more storage media 730 (e.g., one or more mass storage devices) that store applications 742 or data 744. The memory 732 and the storage media 730 may be transient storage or persistent storage. A program stored in the storage medium 730 may include one or more modules (not shown in the figure), and each module may include a series of instruction operations on the mode switching apparatus. Furthermore, the CPUs 722 may be configured to be in communication with the storage media 730 and to perform the series of instructions in the storage media 730 on the mode switching apparatus 700.

The mode switching apparatus 700 may further include one or more power supplies 726, one or more wired or wireless network interfaces 750, one or more input/output interfaces 757, and/or one or more operating systems 741, such as Windows Server™, Mac OS X™, Unix™, Linux™, FreeBSD™, and the like.

The steps in the foregoing embodiment that are performed by the mode switching apparatus may be based on the structure of the mode switching apparatus shown in FIG. 7.

In addition, the application server in FIG. 5 and the functional network element in FIG. 6 may also be divided according to the dividing manner shown in FIG. 7. Reference may be made to the description above, and details are not described herein again.

An embodiment of this disclosure further provides a computer-readable storage medium (e.g., a non-transitory computer-readable storage medium), the computer-readable storage medium storing instructions for mode switching, the instructions, when run on a computer, causing the computer to perform steps performed by the mode switching apparatus, the application server, or the functional network element in the methods according to the embodiments in FIG. 2 to FIG. 3.

An embodiment of this disclosure further provides a computer program product, including instructions for mode switching, the instructions, when run on a computer, causing the computer to perform steps performed by the mode switching apparatus, the application server, or the functional network element in the methods according to the embodiments in FIG. 2 to FIG. 3.

An embodiment of this disclosure further provides a mode switching system. The mode switching system may include the mode switching apparatus according to the embodiments described in FIG. 4 or FIG. 7, or the application server described in FIG. 5, or the functional network element described in FIG. 6.

A person skilled in the art can clearly understand that for convenience and conciseness of description, for specific working processes of the foregoing systems, devices and units, reference may be made to the corresponding processes in the foregoing method embodiments, and details are not described herein again.

In the several embodiments provided in this disclosure, it is to be understood that the disclosed system, apparatus, and method may be implemented in other manners. For example, the described apparatus embodiment is merely an example. For example, the unit division is merely a logical function division and other divisions may be utilized during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, technical solutions of this disclosure may be implemented in the form of a software product. The computer software product is stored in a storage medium and includes several instructions for instructing a computer device (which may be a personal computer, a mode switching apparatus, a network device, or the like) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this disclosure, but not for limiting this disclosure. Although this disclosure is described in detail with reference to the foregoing embodiments, it is to be appreciated by a person of ordinary skill in the art that they may still make modifications to the technical solutions described in the foregoing embodiments or make equivalent replacements to some technical features thereof, without departing from the spirit and scope of the technical solutions of the embodiments of this disclosure.

What is claimed is:

1. A mode switching method for a broadcast service, comprising:
    determining, by a terminal, a trigger instruction when switching of a broadcast mode is to be performed, the trigger instruction being configured to instruct switching of the broadcast mode of the terminal;
    transmitting, by the terminal, the trigger instruction configured to instruct the switching of the broadcast mode to an access network device to enable the access network device to transmit a switching request to a functional network element, the switching request being configured to instruct the functional network element to configure a corresponding mode parameter, the mode parameter being configured to instruct the access network device to obtain a configuration parameter corresponding to the switched broadcast mode and the access network device to transmit the configuration parameter to the terminal;
    receiving, by the terminal, the configuration parameter transmitted by the network access device; and
    switching, by the terminal, to a corresponding broadcast mode according to the configuration parameter to establish a wireless connection with the access network device.

2. The method according to claim 1, wherein the determining the trigger instruction comprises:
    establishing trigger coordination with an application server to determine the trigger instruction.

3. The method according to claim 1, further comprising:
    monitoring application layer information in real time to obtain switching information, the switching information being determined based on a change of a geographic location or of a service policy,
    wherein the determining the trigger instruction includes determining the trigger instruction according to the switching information.

4. The method according to claim 1, further comprising:
    receiving switching information from an application server,
    wherein the determining the trigger instruction includes determining the trigger instruction according to the switching information.

5. The method according to claim 1, further comprising:
    obtaining a measurement report of a neighboring cell, the measurement report indicating a broadcast mode supported by the neighboring cell,
    wherein the determining the trigger instruction includes determining the corresponding broadcast mode according to the measurement report to determine the trigger instruction.

6. The method according to claim 1, further comprising:
    determining a corresponding parameter change value according to the switching of the broadcast mode to generate resource control information, wherein
    the resource control information is included in the trigger instruction to enable the access network device to negotiate among a plurality of neighboring access network devices according to the resource control information, to match the switched broadcast mode and to transmit the switching request to the functional network element.

7. The method according to claim 1, wherein the trigger instruction is configured to instruct switching from one of a broadcast mode and a multicast mode to the other of the broadcast mode and the multicast mode.

8. A terminal for a broadcast service, comprising:
    a memory; and
    a processor configured to execute instructions stored in the memory, the instructions when executed by the processor cause the processor to:
        determine a trigger instruction when switching of a broadcast mode is to be performed, the trigger instruction being configured to instruct switching of the broadcast mode of the terminal;
        transmit the trigger instruction configured to instruct the switching of the broadcast mode to an access network device to enable the access network device to transmit a switching request to a functional network element, the switching request being configured to instruct the functional network element to configure a corresponding mode parameter, the mode parameter being configured to instruct the access network device to obtain a configuration parameter corresponding to the switched broadcast mode and the access network device to transmit the configuration parameter to the terminal;

receive the configuration parameter transmitted by the access network device; and switch to a corresponding broadcast mode according to the configuration parameter to establish a wireless connection with the access network device.

9. The terminal according to claim 8, wherein the instructions further cause the processor to:

establish trigger coordination with an application server to determine the trigger instruction.

10. The terminal according to claim 8, wherein the instructions further cause the processor to:

monitor application layer information in real time to obtain switching information, the switching information being determined based on a change of a geographic location or of a service policy, and determine the trigger instruction according to the switching information.

11. The terminal according to claim 8, wherein the instructions further cause the processor to:

receive switching information from an application server, and determine the trigger instruction according to the switching information.

12. The terminal according to claim 8, wherein the instructions further cause the processor to:

obtain a measurement report of a neighboring cell, the measurement report indicating a broadcast mode supported by the neighboring cell, and determine the corresponding broadcast mode according to the measurement report to determine the trigger instruction.

13. The terminal according to claim 8, wherein the instructions further cause the processor to determine a corresponding parameter change value according to the switching of the broadcast mode to generate resource control information; and the resource control information is included in the trigger instruction to enable the access network device to negotiate among a plurality of neighboring access network devices according to the resource control information, to match the switched broadcast mode and to transmit the switching request to the functional network element.

14. The terminal according to claim 8, wherein the trigger instruction is configured to instruct switching from one of a broadcast mode and a multicast mode to the other of the broadcast mode and the multicast mode.

15. A non-transitory computer-readable storage medium storing instructions which when executed by at least one processor cause the at least one processor to perform the method according to claim 1.

16. A non-transitory computer-readable storage medium storing instructions which when executed by at least one processor cause the at least one processor to perform the method according to claim 6.

* * * * *